United States Patent Office 3,708,589
Patented Jan. 2, 1973

3,708,589
HYPOCHOLESTEROLEMIC PHENOXY-ALIPHATIC ACID COMPOSITIONS
William Laszlo Bencze, New Providence, N.J., assignor to Ciba-Geigy Corporation
No Drawing. Continuation-in-part of application Ser. No. 795,029, Jan. 29, 1969, now Patent No. 3,641,110, which is a continuation-in-part of application Ser. No. 728,871, May 14, 1968, which is a continuation-in-part of application Ser. No. 558,251, June 17, 1966, which in turn is a continuation-in-part of application Ser. No. 323,868, Nov. 15, 1963, now abandoned. This application Oct. 31, 1969, Ser. No. 873,107
Int. Cl. A61k 27/00
U.S. Cl. 424—317  3 Claims

ABSTRACT OF THE DISCLOSURE

Oxygenated benzcycloalkyl - phenoxy-aliphatic acids, e.g. those of the formula

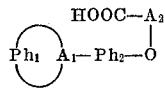

$Ph_1$ = a 1,2-phenylene
$Ph_2$ = a 1,2-, 1,3- or 1,4-phenylene
$A_1$ = mono- or dihydroxy-alkylene or alkanoylene forming 5–7 membered ring
$A_2$ = aliphatic hydrocarbon radical and functional derivatives thereof are hypocholesterolemic agents.

CROSS-REFERENCES TO RELATED APPLICATIONS

This is a continuation-in-part of application Ser. No. 795,029, filed Jan. 29, 1969, now Pat. No. 3,641,110, which in turn is a continuation-in-part of application Ser. No. 728,871, filed May 14, 1968, which in turn is a continuation-in-part of application Ser. No. 558,251, filed June 17, 1966, which in turn is a continuation-in-part of application Ser. No. 323,868, filed Nov. 15, 1963, the latter three of which are now abandoned.

SUMMARY OF THE INVENTION

The present invention concerns and has for its object the provision of new oxygenated benzcycloalkyl-phenoxy-aliphatic acids, preferably of those having the Formula I

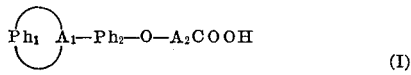

(I)

in which $Ph_1$ is a 1,2-phenylene radical, $Ph_2$ is a 1,2-, 1,3- or 1,4-phenylene radical, $A_1$ is mono- or dihydroxy-lower alkylene or lower alkanoylene forming with $Ph_1$ a 5 to 7 membered ring carrying $Ph_2$ at one ring-carbon atom thereof and $A_2$ is a lower aliphatic hydrocarbon radical, of their functional derivatives, as well as of corresponding pharmaceutical compositions and of methods for the preparation and application of these products. Said compositions are useful hypocholesterolemic agents in the treatment or management of arteriosclerosis.

DESCRIPTION OF THE PREFERRED EMBODIMENTS

The phenylene radicals $Ph_1$ and $Ph_2$ are unsubstituted or substituted by one or more than one of the same or of different substituents attached to any of the four positions available for substitution. Such substituents are, for example, lower alkyl, e.g. methyl, ethyl, n- or i-propyl or -butyl, 3- to 8 ring-membered cycloalkyl, e.g. cyclopropyl, cyclopentyl, cyclohexyl or cycloheptyl, etherified or esterified hydroxy, such as lower alkoxy, e.g. methoxy, ethoxy, n- or i-propoxy or -butoxy, or halogeno, e.g. fluoro, chloro or bromo, or trifluoromethyl. The term "lower," referred to above and hereinafter in connection with organic radicals or compounds respectively, defines such with up to 8, preferably up to 5, carbon atoms. Above all, $Ph_1$ represents 1,2-phenylene, (lower alkyl)-1,2-phenylene, (5 to 7 ring-membered cycloalkyl)-1,2-phenylene, (lower alkoxy)-1,2-phenylene, (halogeno)-1,2-phenylene or (trifluoromethyl)-1,2-phenylene and $Ph_2$ represents 1,2-, 1,3- or preferably 1,4-phenylene, (lower alkyl)-1,2- 1,3- or 1,4-phenylene, (lower alkoxy)-1,2-, 1,3- or 1,4-phenylene, (halogeno)-1,2-, 1,3- or 1,4-phenylene or (trifluoromethyl)-1,2-, 1,3- or 1,4-phenylene.

The trivalent portion $A_1$, attached to two adjacent positions of $Ph_1$, may be an unbranched or branched alkylene chain of preferably 3 to 8, particularly 3 to 5, carbon atoms, which carries at its ring-carbon atoms (a) one or two hydroxy groups or one oxo group and (b) the phenylene radical $Ph_2$. It represents, for example, the moieties of the formulae:

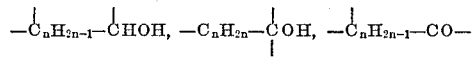

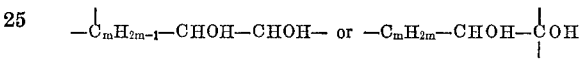

wherein $n$ is an integer from 2 to 8, preferably from 2 to 5, and $m = n - 1$. Most preferred moieties $A_1$ are the following:

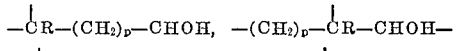

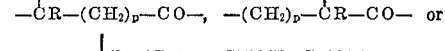

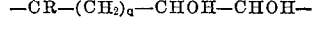

wherein $p$ is an integer from 1 to 3, especially the integer 2, $q = p - 1$ and R is hydrogen or lower alkyl, preferably methyl.

The lower aliphatic radical $A_2$ represents, for example, lower alkylene, alkenylene or alkynylene, preferably such having up to 5 carbon atoms, such as methylene, 1,1- or 1,2-ethylene, 1,1-, 1,2-, 2,2- or 1,3-propylene, 1,1- 1,2-, 2,3- or 1,4-butylene, 1,1-, 2,2-, 3,3- or 2,4-pentylene; ethylene, 1,2-, 2,3- or 1,3-propenylene, 1,4-butenylene, 1,4- or 2,3-but-2-enylene or 2,3-pent-2-enylene; ethynylene, 1,3-propynylene, 1,3-butynylene, 1,4-but-2-ynylene or 1,4-pent-2-ynylene. Said radical may also stand for 1,1-cycloalkylidene having from 3 to 8, preferably from 5 to 7, ring-carbon atoms, e.g. 1,1-cyclopentylidene, 1,1-cyclohexylidene or 1,1-cycloheptylidene, as well as 1,1-cyclopropylidene, 1,1-cyclo-butylidene or 1,1-cyclooctylidene.

Functional derivatives of the acids of Formula I are preferably their esters, for example, their lower alkyl, e.g. methyl, ethyl, n- or i-propyl, n-, i-, sec. or tert. butyl esters, or substituted lower alkyl, particularly tert. amino-lower alkyl, lower alkoxy-lower alkyl or aralkyl, e.g. benzyl or 3-pyridylmethyl, esters, in which the tertiary amino group is above all di-lower alkylamino, e.g. dimethylamino or diethylamino, lower alkyleneimino, e.g. pyrrolidino or piperidino, or mono-aza- or oxa-lower alkyleneimino, such as piperazino or 4-lower alkyl-piperazino, e.g. 4-methyl- or ethyl-piperazino, or morpholino. Other functional derivatives are unsubstituted or substituted amides, e.g. mono- or di-lower alkylamides, mono- or bicyclic lower alkyleneamides, e.g. the N,N-dimethyl- or diethylamide, N,N-butylene or pentyleneamide or 3 - azabicyclo[3,2,2] nonyleneamide, or amides of amino-acids, e.g. glycine, glycyclglycine, taurine, methionine or aspartic acid, as well as the nitriles, hydroxamic acids and salts. In said ester or amide moieties, two heteroatoms are separated from each other by at least 2 carbon atoms, preferably by 2 or 3 carbon atoms, and the tertiary amino group can also be linked with the lower alkyl chain to form a monoazacycloalkyl or -cycloalkyl-lower alkyl moiety, e.g. 2- or 3-pyrrolidyl, 1-(methyl or ethyl)-3-pyrrolidyl, 3- or 4-piperidyl or -piperidyl-methyl.

Salts of the above described compounds are either ammonium or metal salts of the acids, or acid addition salts of the compounds with basic character, especially pharmaceutically acceptable, non-toxic salts, such as the ammonium salts derived from ammonia or amines or, more particularly metal salts, such as alkali or alkaline earth metal, e.g. sodium, potassium, magnesium or calcium salts. Compounds with basic character are, for example, the aminoalkyl esters. Such compounds form acid addition salts, such as those of inorganic or organic acids, e.g. hydrochloric, hydrobromic, sulfuric, phosphoric, formic, acetic, propionic, pivalic, glycolic, lactic, malonic, succinic, maleic, hydroxymaleic, malic, tartaric, citric, benzoic, salicylic, 4-aminosalicylic, 2-phenoxybenzoic, 2-acetoxybenzoic, nicotinic, isonicotinic, methane sulfonic, ethane sulfonic, ethane 1,2-disulfonic, 2-hydroxyethane sulfonic, p-toluene sulfonic or naphthalene 2 - sulfonic acid. Salts, either those of metals or acids, may also be used as intermediates, for example, in the preparation of pharmaceutically acceptable salts, in the purification of the free compounds or for identification or characterization purposes. Functional derivatives of the above compounds are also those of the alcoholic or ketonic functions, for example, lower alkanoic acid esters or lower alkylene or alkylidene ketals, e.g. mono- or diacetates, acetonides or ethylene ketals.

The compounds of this invention possess valuable pharmacological properties. For example, they cause a reduction of the cholesterol and triglyceride level in the blood, as can be demonstrated in vitro or in vivo tests, using for the latter advantageously mammals, e.g. rats, dogs or monkeys, as test objects. The compounds of the invention can be administered orally, e.g. to male rats in the form of aqueous or polyethyleneglycol solutions or suspensions by stomach tube, or to male beagle dogs by gelatine capsules, for example in the dosage range between about 0.1 and 100 mg./kg./day, preferably between about 0.1 and 50 mg./kg./day, especially between about 1 and 25 mg./kg./day. The animals (rats) may either be on a standard or high cholesterol diet and serum total cholesterol is determined in orbital blood before and after treatment with the compounds of the invention. In addition, serum free and esterified glycerol, liver constituents, e.g. free and esterified cholesterol, glyceride-glycerol, lipid-phosphorus, glycogen and protein, can be determined. At high dose levels, e.g. at about 50–100 mg./kg./day, the compounds of the invention cause an enlargement of the liver in male rats, due to an increase in size and number of liver cells. This hepatomegalic effect is reversible upon withdrawal of said compounds. The compounds of the invention also exhibit some anti-inflammatory effects, as can be demonstrated especially in the rat turpentine pleuritis test, and also in the kaolin or carrageenin rat paw edema test, performed, for example, according to Winter et al., Proc. Soc. Exp. Biol. & Med. 111, 544 (1962). According to it, the compounds of the invention are applied, in the form of aqueous solutions or suspensions, by stomach tube to male and female mature rats, in the dosage range between about 1 and 100 mg./kg./day, preferably between about 10 and 75 mg./kg./day, advantageously between about 40 and 60 mg./kg./day. About 1 hour later 0.06 ml. of a 1% aqueous suspension of carrageenin is injected into the rat's left hind paw and 3 hours subsequently any anti-inflammatory activity can be expressed by the difference of the volume and/or weight of the edematous left paw and that of the right paw, as compared with said difference estimated from untreated control animals.

The compounds of the invention are, therefore, useful as hypolipidemic (hypocholesterolemic) agents bringing about an amelioration of certain syndromes, such as those caused by arteriosclerosis, e.g. atherosclerosis, and/or as anti-inflammatory agents in the treatment or management of arthritic and dermatopathologic conditions. Furthermore, they can be used as intermediates in the preparation of other valuable products, particularly of the pharmacologicaly active compounds described in the cross-referenced applications.

Particularly useful are the compounds of Formula I, in which $Ph_1$ represents 1,2-phenylene, (lower alkyl)-1,2-phenylene, (5 to 7 ring-membered cycloalkyl)-1,2-phenylene, (lower alkoxy)-1,2-phenylene, (halogeno)-1,2-phenylene or (trifluoromethyl)-1,2-phenylene, $Ph_2$ is 1,2-, 1,3- or 1,4-phenylene, (lower alkyl)-1,2-, 1,3- or 1,4-phenylene, (lower alkoxy)-1,2-, 1,3- or 1,4-phenylene, (halogeno)-1,2-, 1,3- or 1,4-phenylene or (trifluoromethyl)-1,2-, 1,3- or 1,4-phenylene, $A_2$ is lower alkylene and $A_1$ is one of the moieties

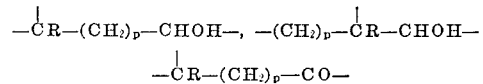
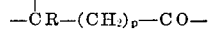

wherein $p$ is an integer from 1 to 3, $q$ is an integer from 0 to 2 and R is hydrogen or lower alkyl; the lower alkyl, lower alkoxy-lower alkyl, $HPh_2$-lower alkyl, pyridyl-lower alkyl, Am-lower alkyl, monoazacycloalkyl or monoazacycloalkyl-lower alkyl esters thereof, wherein alkoxy, Am or the aza-nitrogen is separated from the carboxy oxygen by at least 2 carbon atoms and Am is di-lower alkylamino, lower alkyleneimino or mono-aza or oxa-lower alkyleneimino, the amide, mono- or di-lower alkylamides, mono- or bicyclic lower alkyleneamides, the hydroxamic acid, nitrile, ammonium, alkali metal or alkaline earth metal salts thereof or pharmaceutically acceptable acid addition salts of the basic esters.

Preferred are compounds of Formula II

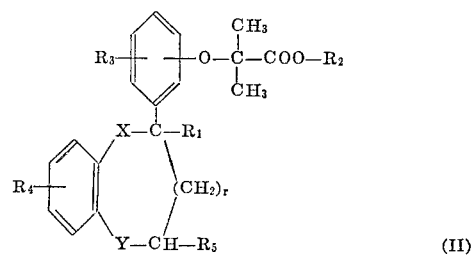

in which one of X and Y is a direct bond and the other is hydroxymethylene or carbonyl, $r$ is an integer from 0 to 2, $R_1$ is hydrogen or lower alkyl, $R_2$ is hydrogen, lower alkyl, lower alkoxy-lower alkyl, phenyl-lower alkyl, pyridyl-lower alkyl, di-lower alkylamino-lower alkyl, lower alkyleneimino-lower alkyl, N-lower alkyl-piperidyl or N-lower alkyl-piperidyl-lower alkyl, in which the nitrogen atoms are separated from the carboxy oxygen atom by at least two carbon atoms, each of $R_3$ and $R_4$ is hydrogen, lower alkyl or halogen and $R_5$ is hydrogen or it is hydroxy when Y is hydroxymethylene, the ammonium, alkali metal or alkaline earth metal salts of the compounds in which $R_2$ is hydrogen and pharmaceutically acceptable acid addition salts of the compounds in which $R_2$ contains a nitrogen atom.

Especially valuable compounds are those of Formula III

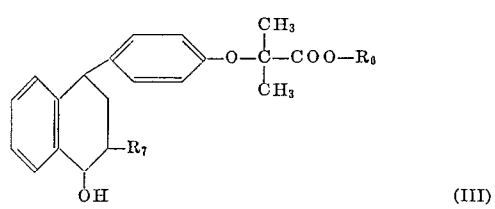

in which $R_6$ is hydrogen, an alkali metal or lower alkyl and $R_7$ is hydrogen or hydroxy which, when given at oral doses between about 0.1 and 50 mg./kg./day, preferably between about 1.0 and 25 mg./kg./day, to rats being either on a normal or high cholesterol diet, show outstanding hypocholesterolemic activity.

The compounds of this invention are prepared according to methods known per se. For example, they are obtained by:

(a) converting in a compound of Formula IV

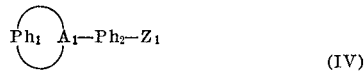

(IV)

in which $Z_1$ is a substituent capable of being converted into the free or functionally converted $-O-A_2-COOH$ group, the substituent $Z_1$ into said group or (b) converting in a compound of Formula V

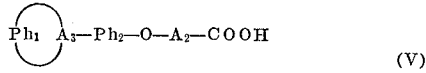

(V)

or a functional derivative thereof, in which $A_3$ is lower alkylene or alkenylene forming with $Ph_1$ a 5 to 7 membered ring carrying $Ph_2$ at one ring-carbon atom thereof, the $A_3$ portion into the $A_1$ moiety and, if desired, converting any resulting compound into another compound of the invention.

In the starting material of Formula IV, the substituent $Z_1$ may be converted into the free or functionally converted $-O-A_2-COOH$ group in one step or in stages. A particular suitable substituent $Z_1$ is a salified or esterified hydroxy group. Such salified phenolic hydroxy group more particularly contains a metal atom, such as an alkali metal, e.g. lithium, sodium or potassium atom. An esterified phenolic hydroxy group is, for example, such derived from a carbonic acid half ester or halide, i.e. $Z_1$ represents the group $-O-CO-R_0$, wherein $R_0$ is esterified or etherified hydroxy, for example halogeno, e.g. chloro or bromo, or lower alkoxy, e.g. methoxy or ethoxy, as well as phenoxy. Such starting material is reacted with the acid $Z_2-A_2-COOH$ or a functional derivative thereof, whereby one of $Z_1$ and $Z_2$ is a reactively esterified hydroxy group, and the other a free or salified hydroxy group. Advantageously starting materials are chosen, wherein $Z_1$ is the above-mentioned salified phenolic hydroxy group and $Z_2$ is hydroxy esterified with a strong mineral acid, particularly a hydrohalic acid, e.g. hydrochloric or hydrobromic acid, or with sulfuric or a strong organic sulfonic acid, such as a lower alkane or benzene sulfonic acid, e.g. methane, ethane or p-toluene sulfonic acid. Preferred reactants are said acids, the corresponding esters or nitriles, wherein $Z_2$ is halogeno, having preferably an atomic weight greater than 19 and representing above all chloro or bromo.

Instead of reacting said salified phenolic starting material with said aliphatic acid or its derivative, it can be reacted with a corresponding aliphatic aldehyde or ketone in the presence of a tri- or tetrahalogenated methane derivative as, for example, chloroform, 1,1,1-trichloroacetone, bromoform, 1,1,1-tribromo-acetone, iodoform, chloral, chloral hydrate, bromal, bromal hydrate, carbon tetrachloride or carbon tetrabromide. The reaction is advantageously carried out in the presence of a diluent, which may be furnished by an excess of the aldehyde or ketone reagent.

In case $Z_1$ is the above-described esterified hydroxy group, the corresponding starting material is reacted with said acid or its derivatives, wherein $Z_2$ is hydroxy, preferably at temperatures ranging between about 100–210°, if desired, in the presence of a suitable transesterification catalyst, e.g. sodium or potassium carbonate, and in the absence or presence of a suitable diluent.

The compounds of Formula V may be converted into those of the invention according to known methods, preferably by treatment with agents capable of converting methylene into hydroxymethylene or carbonyl, or ethenylene into mono- or dihydroxyethylene. Such oxidation agents are, for example, heavy metal oxides containing advantageously more than 2 oxygen atoms per metal atom, the corresponding acids derived therefrom or their salts, such as chromium trioxide, chromic acid or sodium bichromate, vanadium pentoxide, potassium permanganate, osmium or ruthenium tetroxide, as well as hydrogen peroxide or peracids, preferably percarboxylic acids, such as lower peralkanoic or perbenzoic acids, e.g. peracetic, perbenzoic, 3-chloroperbenzoic or monoperphthalic acid. Said peroxides are preferably useful in the oxidation of compounds of Formula V, wherein $A_3$ is lower alkenylene, in order to form epoxides, which are cleaved either hydrolytically, for example with the use of aqueous mineral acids, in order to obtain the corresponding dihydroxy compounds, or hydrogenolytically, for example with the use of reducing agents, such as complex light metal hydrides, e.g. lithium aluminum hydride, to yield the corresponding monohydroxy compounds.

The resulting compounds of the invention can be converted into each other according to methods known per se. For example in those containing a free carboxyl group, such group is converted into a functionally converted carboxyl group according to known procedures, for example, by treatment with an alcohol, such as a lower alkanol, in the presence of an esterifying agent, e.g. hydrochloric or sulfuric acid, or with a corresponding diazo-compound. The carboxylic acid may also be converted into its halide, e.g. chloride, and the latter is reacted with an alkali metal, e.g. sodium or potassium alcoholate, such as lower alkoxide, ammonia, a primary or secondary amine, in order to yield esters or amides respectively. The carboxylic acid may further be reacted with a reactive ester of an alcohol, such as an aliphatic halide, e.g. a lower alkyl halide or tert. amino-lower alkyl halide, in the presence of a base, e.g. potassium carbonate. An ammonium salt of said acids may be dehydrated, for example, by treatment with phosphorus pentoxide or oxychloride, in order to yield the amide, which may be further dehydrated to yield the corresponding nitrile. In resulting compounds containing a functionally converted carboxyl group, this group may be converted into a free or another converted carboxyl group by known methods. For example, resulting esters may be hydrolysed, advantageously by treatment with a base, e.g. sodium or potassium hydroxide. A nitrile or amide may be converted into the free acid by hydrolysis with either a strong base or acid, e.g. sulfuric acid. Furthermore, a resulting ester may be transesterified for example, by treatment with an alcohol, e.g. a lower alkanol, in the presence of a metal alcoholate, e.g. a sodium, potassium or aluminum lower alkoxide, an alkali metal cyanide, or N-benzyl trimethylammonium hydroxide. A resulting ester may also be converted into an amide, for example, by treatment with ammonia, a primary or a secondary amine, if necessary, under increased pressure or converted into the hydroxamic acid by treatment with hydroxylamine. A resulting nitrile can also be converted into a corresponding ester, for example, by treatment with an alcohol, e.g. a lower alkanol, in the presence of a suitable mineral acid, e.g. sulfuric or hydrochloric acid.

A resulting acid may be converted into its salts according to conventional methods, for example, by reacting it with an about stoichiometric amount of a suitable salt-forming reagent, such as ammonium hydroxide, or an alkali metal hydroxide, amide or hydride. A salt of this type may be reconverted into the free acid by treatment with an acid, e.g. hydrochloric, sulfuric or acetic acid. A resulting compound having an acid addition salt-forming group, such as an amino group, may be converted into an acid addition salt thereof, for example, by reacting it with an acid, such as one of the previously-mentioned acids or with a suitable anion exchange preparation, and isolating the desired salt. The latter may be converted into the free compound by treatment with a base, e.g. a metal hydroxide, ammonia or a hydroxyl ion exchange preparation. Care should be taken in the above reactions with the compounds of Formula I, where $A_1$ is hydroxy-lower alkylene, in order to avoid dehydration, which takes place under strong acidic conditions, leading to compounds of Formula V, wherein $A_3$ is lower alkenylene.

Finally, resulting compounds, wherein $A_1$ is lower alkanoylene can be reduced with the use of ketone reducing agents, such as catalytically activated or nascent hydrogen, e.g. hydrogen applied in the presence of platinum or nickel catalysts or generated electrolytically or by the action of metals on hydrogen sources, e.g. zinc on alkali metal hydroxides, alkali or alkaline earth metals or their amalgams, as well as aluminum amalgam, on alcohols, e.g. lower alkanols, advantageously with simple or complex light metal hydrides, such as borohydrides or alkali metal aluminum or borohydrides, e.g. lithium aluminum hydride or sodium borohydride, or according to the Meerwein-Ponndorf-Verley reaction, i.e. the aluminum alkoxide reduction. Conversely, resulting compounds, wherein $A_1$ is lower hydroxyalkylene, may be oxidized to the corresponding lower alkanoylene compounds, for example according to the Oppenauer oxidation, using said aluminum alkoxides and aliphatic or cycloaliphatic ketones, e.g. acetone or cyclohexanone, or with the use of the known alcohol dehydrogenation (oxidation) agents, such as heavy metal salts or oxides, such as alkali metal chromates or permanganates, chromic, ferric, cupric or lead IV salts, e.g. halides, sulfates or acetates thereof.

Resulting mixtures of isomers may be separated into the single isomers by exploiting physicochemical differences, such as differences in solubility, adsorption or boiling points between such compounds. Racemates are resolved into the optical antipodes according to conventional resolution procedures, e.g. separation of diastereomeric salts or esters, for example, salts of d-α-(phenyl or l-naphthyl)-ethylamine or l-cinchonidine with the d,l-acids of Formula I or the d- or l-tartrates of their basic esters, or esters of the phenolic starting material with optically active acids, e.g. d-camphor sulfonic acid.

The above reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Such starting materials are preferably used, which lead to those products indicated above as the preferred embodiments of the invention.

The starting material used is known or, if new, can be prepared according to the methods used in the preparation of the known products. For example, the compounds of Formula IV can be prepared from products of the formula

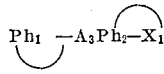

analogous to the oxidation methods described for the compounds of Formula V.

The pharmacologically active compounds of the invention are useful in the manufacture of pharmaceutical compositions containing an effective amount thereof in conjunction or admixture with excipients suitable for either enteral, parenteral or topical application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethylene glycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories or ointments are advantageously fatty emulsions or suspensions. They may be sterilized and/or contain adjuvants, such as preserving, stabilizing, wetting or emulsifying agents, solution promoters, salts for regulating and osmotic pressure and/or buffers. Said pharmaceutical compositions may also contain other therapeutically valuable substances. They are prepared according to conventional mixing, granulating or coating methods respectively and contain about 0.1 to 75%, preferably about 1 to 50%, of the active ingredient.

The following examples are intended to illustrate the invention and are not to be construed as being limitations thereon. Temperatures are given in degrees centigrade, and all parts wherever given are parts of weight. Unless mentioned otherwise, optical rotations are determined in a 1% methanolic solution.

Example 1

The mixture of 0.8 g. 1-oxo-4-(4-hydroxyphenyl)-1,2,3,4-tetrahydronaphthalene, 0.16 g. 56% sodium hydride in mineral oil and 35 ml. xylene is stirred at the steam bath until the hydrogen evolution ceases. Hereupon 0.668 g. ethyl 2-bromo-isobutyrate are added and the mixture refluxed for 6 hours. It is filtered, the filtrate evaporated in vacuo, the residue distilled and the fraction boiling at 185–200°/0.35 mm. Hg collected. It is taken up in diethyl ether, the mixture filtered and the filtrate evaporated, to yield the ethyl 2-[4-(4-oxo-1,2,3,4-tetrahydro-1-naphthyl)-phenoxy]-isobutyrate of the formula

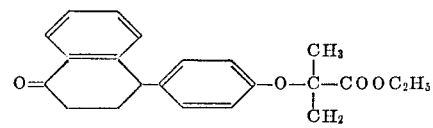

showing in the I.R.-spectrum strong bands at 1720 and 1670 cm.$^{-1}$.

The mixture of 0.8 g. thereof, 0.25 g. potassium hydroxide and 8 ml. methanol is allowed to stand overnight at room temperature and is evaporated in vacuo. The residue is taken up in water, the solution washed with hexane, the aqueous phase acidified with hydrochloric acid and extracted with diethyl ether. The extract is shaken with aqueous sodium bicarbonate, the aqueous solution again acidified with hydrochloric acid, extracted with diethyl ether and the extract evaporated, to yield the corresponding free acid melting at 124–126°.

The starting material is prepared as follows: To the mixture of 30.7 g. 1-oxo-4-phenyl-1,2,3,4-tetrahydronaphthalene and 32 ml. acetic anhydride, the solution of 6.4 ml. fuming nitric acid in 10 ml. acetic anhydride is added dropwise while stirring and cooling with an ice bath. The mixture is allowed to stand at room temperature overnight, poured onto ice, extracted with diethyl ether, the extract washed with aqueous sodium bicarbonate, dried and evaporated. The mixture of 27 g. of the residue, 27 g. hydroxylamine hydrochloride and 250 ml. pyridine is refluxed for 18 hours and evaporated in vacuo. The residue is taken up in water, the mixture extracted with diethyl ether, the extract washed with water, dried, evaporated and the residue recrystallized from ethanol to yield the oxime of the 1-oxo-4-(4-nitrophenyl)-1,2,3,4-tetrahydronaphthalene, melting at 208 to 212°.

The mixture of 5.8 g. thereof and 50 ml. 6 N hydrochloric acid is refluxed for three hours, diluted with water and extracted with ethyl acetate. The extract is dried, evaporated and the residue recrystallized from aqueous ethanol, to yield the corresponding free ketone melting at 130 to 132°.

The solution of 3.7 g. thereof in 100 ml. 95% aqueous ethanol is hydrogenated over 0.4 g. 10% palladium on charcoal at room temperature at 3 at. The mixture is filtered, the filtrate concentrated and the precipitate formed in the cold filtered off, to yield the 1-oxo-(4-aminophenyl)-1,2,3,4-tetrahydronaphthalene melting at 130 to 136°.

The solution of 2.8 g. thereof in 3 ml. dioxane, 3.5 ml. water and 2.6 ml. concentrated sulfuric acid is diazotized with the use of 0.825 g. sodium nitrile in 2 ml. water at 0°. The diazonium salt solution obtained is added dropwise to the boiling mixture of 8 ml. concentrated sulfuric acid and 6 ml. water during 30 minutes and the mixture poured over ice. It is extracted with chloroform, the extract dried, evaporated, the residue recrystallized from diethyl ether-hexane and sublimed at 0.3 mm. Hg, to yield the 1-oxo-4-(4-hydroxyphenyl) - 1,2,3,4 - tetrahydronaphthalene melting at 148 to 151°.

Example 2

The mixture of 2-[4-(4-oxo-1,2,3,4-tetrahydro-1-naphthyl)-phenoxy]-isobutyric acid, 5 ml. 95% ethanol and 0.1 g. sodium borohydride is stirred at room temperature for 5 hours. After the addition of a few drops acetic acid, the mixture is evaporated in vacuo, the residue taken up in water and the mixture extracted with chloroform. The extract is dried, filtered and evaporated, to yield the 2-[4-(4 - hydroxy - 1,2,3,4 - tetrahydro-1-naphthyl)-phenoxy]-isobutyric acid of the formula

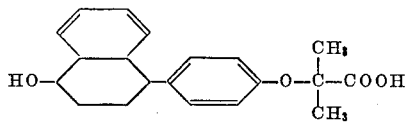

showing in the U.V.-spectrum maxima at 224 m$\mu$ (E=15,790) and 274 m$\mu$ (E=1,480).

Example 3

The solution of 0.4 g. n-butyl 2-[4-(3,4-epoxy-1,2,3,4-tetrahydro-1-naphthyl)-phenoxy]-isobutyrate in the minimum amount of 0.1 N 95% aqueous ethanolic hydrochloric acid is allowed to stand overnight at room temperature. It is evaporated in vacuo, the residue taken up in 10 ml. ethanol, the solution combined with 5 ml. 2 N aqueous potassium hydroxide, the mixture allowed to stand at room temperature overnight and slowly concentrated. The concentrate is diluted with 5 ml. water, washed with diethyl ether, the aqueous phase acidified with hydrochloric acid and extracted with diethyl ether. The extract is washed with brine, dried and evaporated, to yield the 2 - [4 - (trans - 3,4-dihydroxy-1,2,3,4-tetrahydro-1-naphthyl)-phenoxy]-isobutyric acid of the formula

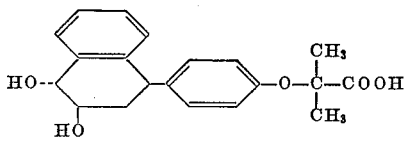

showing in the U.V.-spectrum maxima at 267 m$\mu$ (E= 1,310) and 283 m$\mu$ (E=910). The corresponding cis-3,4-dihydroxy compound of the formula

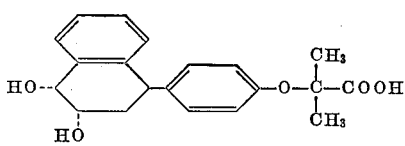

can be obtained directly from the 2-[4-(1,2-dihydro-1-naphthyl)-phenoxy]-isobutyric acid or its n-butyl ester by oxidation with osmium tetroxide.

The starting material is prepared as follows: The mixture of 0.5 g. 2-[4-(4-hydroxy-1,2,3,4-tetrahydro-1-naphthyl)-phenoxy]-isobutyric acid and 10 ml. 90% aqueous formic acid is refluxed for 2 hours and slowly evaporated. The residue is taken up in water, the mixture extracted with diethyl ether, the extract washed with water, dried and evaporated, to yield the 2-[4-(1,2-dihydro-1-naphthyl)-phenoxy]-isobutyric acid, M.P. 105–106°

The mixture of 0.5 g. thereof, 0.5 ml. thionyl chloride and 5 ml. benzene is refluxed for 4 hours and evaporated in vacuo. The residue is taken up twice in 5 ml. benzene and the solution again evaporated. The residue is taken up in 5 ml. dry n-butanol and the solution slowly evaporated. The residue is taken up in 10 ml. chloroform, the solution washed with aqueous sodium bicarbonate, dried and concentrated to about 2 ml. The ice cold concentrate is combined with the cold solution of 0.5 g. 3-chloroperbenzoic acid in 2 ml. chloroform and the mixture stirred for 1 hour in an ice bath. After standing for 24 hours in the refrigerator, it is diluted with 16 ml. chloroform, washed with cold aqueous sodium carbonate and brine, dried and evaporated, to yield the n-butyl 2-[4-(3,4-epoxy-1,2,3,4-tetrahydro-1-naphthyl)-phenoxy]-isobutyrate.

Example 4

To the solution of 60 g. methyl 2-[4-(1,2,3,4-tetrahydro-1-naphthyl)-phenoxy]-isobutyrate in 250 ml. carbon tetrachloride, the solution of 60 g. chromium trioxide in 250 ml. acetic anhydride is added dropwise during 1½ hours while stirring and cooling the mixture to about 0–10°. It is stirred for an additional hour at 0° and poured onto ice water. The organic phase is separated and the aqueous solution extracted with carbon tetrachloride. The combined organic solutions are washed with water, saturated aqueous sodium bicarbonate, dried, filtered and evaporated. The residue is chromatographed on 1.11 kg. alumina (neutral, activity III) and eluted with hexane-benzene: (a) 400 ml. (1:1), (b) 800 ml. (3:5), (c) 400 ml. (1:3). The fractions obtained from the 3:5 and 1:3 mixtures are combined, evaporated and the residue recrystallized from hexane-diethyl ether, to yield the methyl 2 - [4-(4-oxo-1,2,3,4-tetrahydro-1-naphthyl)-phenoxy]-isobutyrate of the formula

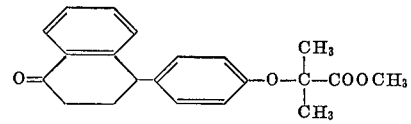

melting at 83–85°.

The mixture of 14 g. thereof, 4 g. potassium hydroxide and 100 ml. methanol is allowed to stand overnight at room temperature and evaporated in vacuo. The residue is taken up in water, the solution acidified with concentrated hydrochloric acid and extracted with diethyl ether. The extract is dried, filtered, evaporated and the residue recrystallized from diethyl ether, to yield the corresponding free acid melting at 124–126°; it is identical with the acid described in Example 1.

Example 5

To the mixture of 2.8 g. 1-oxo-4-(4-hydroxyphenyl)-1,2,3,4-tetrahydronaphthalene, 25 ml. acetone and 4 g. sodium hydroxide, 2.8 g. chloroform in 10 ml. acetone are added dropwise while stirring and the whole is refluxed for 1 hour. After cooling it is filtered, the residue dissolved in water, the solution acidified with 2 N hydrochloric acid and extracted with diethyl ether. The extract is washed with water and brine, dried, evaporated and the residue recrystallized from hexane-benzene, to yield the 2-[4-(4-oxo-1,2,3,4-tetrahydro-1-naphthyl)-phenoxy]-isobutyric acid melting at 124–126°; it is identical with that obtained according to Examples 1 and 4.

The starting material is prepared as follows: To the solution of 30 g. 1-(4-hydroxyphenyl)-1,2,3,4-tetrahydronaphthalene in the minimum amount of acetone, the solution of 6 g. sodium hydroxide in 60 ml. water is added, followed by the portionwise addition of 21 g. benzoyl chloride in 15 ml. acetone while stirring. The resulting suspension is diluted with water, filtered and the residue recrystallized from isopropanol, to yield the 1-(4-benzoyloxyphenyl)-1,2,3,4-tetrahydronaphthalene melting at 106–108°.

To the solution of 5 g. thereof in 50 ml. carbon tetrachloride, the mixture of 5 g. chromium trioxide and 25 ml. acetic anhydride is added dropwise during 1 hour while stirring and cooling to 0–10°. The mixture is stirred for additional 2 hours at 0°, poured into ice water and extracted with diethyl ether. The extract is washed with aqueous sodium carbonate and water, dried, filtered, evaporated and the residue recrystallized from methanol, to yield the 1-oxo-4-(4-benzoyloxyphenyl)-1,2,3,4-tetrahydronaphthalene melting at 175–176°.

The mixture of 5.4 g. thereof, 5.4 g. potassium hydroxide and 200 ml. methanol is refluxed for 5 minutes and evaporated. The residue is taken up in water, the solution extracted with diethyl ether, the extract washed with sodium bicarbonate, water and brine, dried and evaporated. The residue is recrystallized from ethyl acetate, to yield the 1-oxo-4-(4-hydroxyphenyl)-1,2,3,4-tetrahydronaphthalene melting at 151–153°.

Example 6

To the solution of 2.3 g. 2-[4-(4-oxo-1,2,3,4-tetrahydro-1-naphthyl)-phenoxy]-isobutyric acid in 100 ml. 95% ethanol, 0.92 g. sodium borohydride are added portionwise while stirring and cooling with ice. After standing at room temperature overnight, the mixture is acidified with diluted acetic acid and concentrated in vacuo. The residue is taken up in water, the solution extracted with diethyl ether, the extract dried, filtered, evaporated and the residue recrystallized first from petroleum ether-diethyl ether and secondly from benzene, to yield the trans-2-[4-(4-hydroxy-1,2,3,4-tetrahydro-1-naphthyl)-phenoxy]-isobutyric acid of the formula

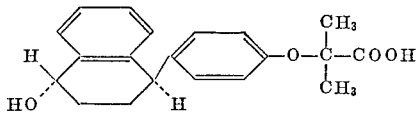

melting at 148–150°.

The combined mother liquors are evaporated, the residue taken up in the minimum amount of diethyl ether and the solution dropwise combined with cyclohexylamine, until no further precipitate formation is observed. The residue is filtered off and recrystallized from acetone, to yield the cyclohexylammonium cis-2-[4-(4-hydroxy-1,2,3,4-tetrahydro-1-naphthyl)-phenoxy]-isobutyrate of the formula

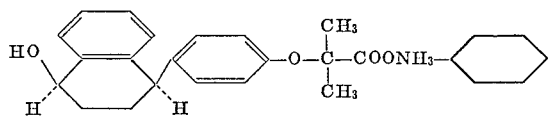

melting at 211–214°. It is taken up in diethyl ether, the solution shaken with 2 N sulfuric acid, the organic layer separated, evaporated and the residue dried in a high vacuum, to yield the corresponding amorphous free acid.

Example 7

To the mixture of 10 g. 1-oxo-2-(4-hydroxyphenyl)-1,2,3,4-tetrahydronaphthalene, 75 ml. acetone and 14.3 g. sodium hydroxide, 10 g. chloroform in 30 ml. acetone are added dropwise while stirring and refluxing. Stirring is facilitated by dilution with acetone and the mixture refluxed for another hour. It is evaporated in vacuo, the residue taken up in water, the solution acidified with 2 N hydrochloric acid and extracted with diethyl ether. The extract is shaken with aqueous sodium bicarbonate, the aqueous layer acidified with 2 N hydrochloric acid and extracted with diethyl ether. The extract is washed with water, dried, filtered and evaporated, to yield the oily 2-[4-(1-oxo-1,2,3,4-tetrahydro-2-naphthyl)-phenoxy]-isobutyric acid of the formula

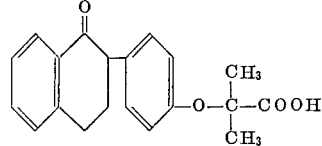

showing in the I.R.-spectrum bands at 1731 and 1678.

The starting material is prepared as follows: To the mixture of 103 g. 4-methoxyphenyl-acetonitrile and 500 ml. dimethylformamide, 33.5 g. of a 53% suspension of sodium hydride in mineral oil are added portionwise while stirring and stirring is continued until the hydrogen evolution ceases. The mixture is cooled with ice and 130 g. 2-phenethyl bromide in 500 ml. toluene are added dropwise while stirring and the mixture is allowed to stand at room temperature overnight. It is filtered, the filtrate evaporated in vacuo, the residue taken up in water, the mixture extracted with diethyl ether, the extract dried, filtered and evaporated, to yield the α-(4-methoxyphenyl)-γ-phenylbutyronitrile.

The mixture of 137 g. thereof, 360 ml. 50% aqueous sodium hydroxide and 545 ml. ethylene glycol is refluxed for 5 hours and allowed to stand overnight at room temperature. It is poured into 2 liters of water, the mixture washed with diethyl ether, the aqueous layer acidified with concentrated hydrochloric acid and extracted with diethyl ether. The extract is dried, filtered and evaporated in vacuo. The residue is distilled, the fraction boiling at 185–200°/0.25 mm. Hg collected and recrystallized from hexane to yield the α-(4-methoxyphenyl)-γ-phenylbutyric acid melting at 94–96°.

72 g. thereof are added portionwise to the mixture of 59.5 g. phosphorus pentachloride and 100 ml. benzene, the whole is refluxed for 15 minutes and evaporated in vacuo. The residue is taken up 2 times in benzene and again evaporated in vacuo. It is finally taken up in 500 ml. benzene and the solution added dropwise to the solution of 59.5 g. aluminum chloride in 500 ml. benzene while stirring and cooling with ice. After stirring for 2 hours at room temperature the mixture is refluxed for 2 hours and allowed to stand overnight at room temperature. It is poured onto ice and concentrated hydrochloric acid, the mixture extracted with benzene, the extract dried, filtered, evaporated and the residue recrystallized from isopropanol to yield the 1-oxo-2-(4-methoxy-phenyl)-1,2,3,4-tetrahydronaphthalene melting at 107–110°. The mixture of 20 g. thereof, 350 ml. acetic acid and 350 ml. 48% hydrobromic acid is refluxed for 6 hours and allowed to stand at room temperature overnight. It is diluted with water, extracted with diethyl ether, the extract washed with water and saturated aqueous sodium bicarbonate and shaken with 10% aqueous sodium hydroxide. The aqueous layer is acidified with concentrated hydrochloric acid, extracted with diethyl ether, the extract washed with water, dried, filtered, evaporated and the residue recrystallized from ethanol to yield the 1-oxo-2-(4-hydroxyphenyl)-1,2,3,4-tetrahydronaphthalene melting at 137–138°.

Example 8

The mixture of 10.5 g. 2-[4-(1-oxo-1,2,3,4-tetrahydro-2-naphthyl)-phenoxy]-isobutyric acid and 200 ml. saturated methanolic hydrochloric acid is refluxed overnight and evaporated in vacuo. The residue is taken up in water, the mixture extracted with diethyl ether, the extract washed with aqueous sodium bicarbonate, dried, filtered and evaporated. The residue is distilled and the fraction boiling at 190–210°/0.25 mm. Hg collected to yield the methyl 2-[4-(1-oxo-1,2,3,4-tetrahydro-2-naphthyl-phenoxy]-isobutyrate.

Example 9

To the refluxing mixture of 4.4 g. 1-oxo-2-methyl-2-(4-hydroxyphenyl) - 1,2,3,4 - tetrahydronaphthalene, 50 ml. acetone and 5.95 g. sodium hydroxide, 4.15 g. chloroform in 15 ml. acetone are added while stirring. The mixture is refluxed for 1 hour during which time it is successively diluted with 200 ml. acetone. After evaporation in vacuo the residue is taken up in water, the solution acidified with 2 N hydrochloric acid and extracted with diethyl ether. The extract is shaken with aqueous sodium bicarbonate, the aqueous layer acidified with 2 N hydrochloric acid and again extracted with diethyl ether. The extract is washed with water, dried and evaporated in vacuo to yield the oily 2 - [4-(1-oxo-2-methyl-1,2,3,4-tetrahydro-2-naphthyl)-phenoxy]-isobutyric acid.

The mixture of 6.4 g. thereof and 100 ml. methanolic hydrochloric acid is refluxed for 24 hours and evaporated in vacuo. The residue is taken up in water, the mixture extracted with diethyl ether, the extract washed with aqueous sodium bicarbonate, dried, filtered, evaporated and the residue recrystallized from isopropanol to yield the corresponding methyl ester of the formula

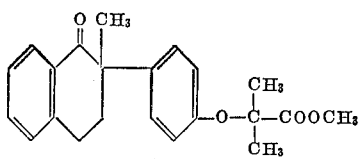

melting at 99–100°.

The starting material is prepared as follows: To the mixture of 15 g. 1-oxo-2-(4-methoxyphenyl)-1,2,3,4-tetrahydronaphthalene, 50 ml. dimethylformamide and 25 ml. toluene, 2.86 g. 53% sodium hydride are added portionwise while stirring and cooling with ice. After 2 hours the mixture of 8.5 g. methyl iodide and 25 ml. toluene is added dropwise while stirring and cooling with ice. After standing overnight the mixture is diluted with diethyl ether, filtered and the residue washed with diethyl ether. The filtrate is evaporated in vacuo, the residue taken up in water, the mixture extracted with diethyl ether, the extract washed with water, dried, evaporated and the residue recrystallized from isopropanol to yield the 1-oxo-2-methyl-2-(4-methoxyphenyl)-1,2,3,4-tetrahydronaphthalene melting at 62–63°.

The mixture of 8.5 g. thereof, 140 ml. acetic acid and 140 ml. 48% hydrobromic acid is refluxed for 6 hours and allowed to stand overnight at room temperature. It is poured onto ice water, the mitxure extracted with diethyl ether, the extract washed with aqueous sodium bicarbonate, dried, filtered and evaporated. The residue is distilled, the fraction boiling at 180–200°/0.25 mm. Hg collected and recrystallized from hexane-benzene to yield the 1 - oxo - 2-methyl-2-(4-hydroxyphenyl)-1,2,3,4-tetrahydronaphthalene melting at 126–128°.

Example 10

To the refluxing mixture of 4.8 g. 2-(4-hydroxyphenyl)-1,2,3,4-tetrahydro-1-naphthol, 50 ml. acetone and 7.8 g. sodium hydroxide, 4.2 g. chloroform in 30 ml. acetone are added dropwise while stirring. Stirring is facilitated by dilution with acetone and the mixture refluxed for one hour. It is evaporated in vacuo, the residue taken up in water, the solution acidified with 2 N hydrochloric acid and extracted with diethyl ether. The extract is washed with aqueous sodium bicarbonate, the aqueous layer acidified with 2 N hydrochloric acid and again extracted with diethyl ether. The extract is washed with water, dried, filtered, evaporated and the residue recrystallized from ethyl acetate-petroleum ether and hexane-diethyl ether, to yield 2 - [4 - (1-hydroxy-1,2,3,4-tetrahydro-2-naphthyl)-phenoxy]-isobutyric acid of the formula

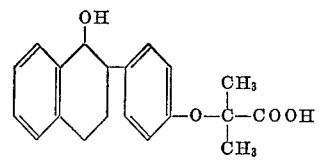

melting at 138 to 140°.

The starting material is prepared as follows: To the solution of 11.9 g. 1 - oxo-2-(4-hydroxyphenyl)-1,2,3,4-tetrahydronaphthalene in 200 ml. 95% ethanol, 3.7 g. sodium borohydride are added portionwise while stirring and cooling. The mixture is allowed to stand at room temperature overnight, acidified with diluted acetic acid and evaporated in vacuo. The residue is taken up in water, the mixture extracted with diethyl ether, the extract washed with aqueous sodium bicarbonate, water, and brine, dried, evaporated and the residue recrystallized from aqueous ethanol, to yield the 2-(4-hydroxyphenyl)-1,2,3,4-tetrahydro-1-naphthol melting at 164 to 166°.

Example 11

To the solution of 3.2 g. methyl 2-[4-(1,2-dihydro-1-naphthyl)-phenoxy]-isobutyrate in 60 ml. pyridine 2.7 g. osmium tetroxide are added and the mixture stirred at room temperature for two hours. Thereupon the mixture of 4.7 g. sodium bisulfite, 78 ml. water and 52 ml. pyridine is added and stirring is continued for a half hour. It is extracted with chloroform, the extract washed with 2 N-hydrochloric acid and water, dried, evaporated and the residue recrystallized from hexane-diethyl ether, to yield the methyl 2 - [4-(cis-3,4-dihydroxy-1,2,3,4-tetrahydro-1-naphthyl)-phenoxy]-isobutyrate melting at 104 to 105°. After saponification with methanolic potassium hydroxide and acidification with hydrochloric acid the corresponding free acid is obtained, M.P. 172–173°, which is identical with that described in Example 3.

The starting material is prepared as follows: To the solution of 8.1 g. methyl 2-[4-(4-oxo-1,2,3,4-tetrahydro-1-naphthyl)-phenoxy]-isobutyrate in 250 ml. anhydrous methanol, 1.8 g. sodium borohydride are added portionwise while cooling and the mixture is stirred for five hours. It is acidified with acetic acid, evaporated in vacuo and the residue taken up in water. The mixture is extracted with diethyl ether, the extract washed with aqueous sodium bicarbonate and evaporated, to yield the oily methyl 2-[4-(4 - hydroxy-1,2,3,4-tetrahydro-1-naphthyl)-phenoxy]-isobutyrate.

The mixture of 6 g. thereof and 60 ml. 90% formic acid is refluxed for fifteen minutes and poured into water. The mixture is extracted with diethyl ether, the extract washed with water and aqueous sodium bicarbonate, dried, filtered and evaporated. The residue is distilled, the fraction boiling at 180–200°/0.3 mm. Hg collected and chromatographed on alumina (neutral, activity III). The column is eluted with 250 ml. benzene-hexane (1:1) and 250 ml. benzene and the combined fractions evaporated, to yield the methyl 2-[4-(1,2-dihydro-1-naphthyl)-phenoxy]-isobutyrate.

The mixture of 0.7 g. thereof, 25 ml. methanol and 1 g. potassium hydroxide is allowed to stand overnight at room temperature and evaporated in vacuo. The residue is taken up in 5 ml. water, the precipitate formed filtered off, dissolved in 25 ml. water and the solution acidified with 2 N hydrochloric acid. It is extracted with diethyl ether, the extract dried, evaporated, and the residue recrystallized from hexane and aqueous ethanol to yield the corresponding free acid melting at 105 to 106°; it is identical with that described in Example 3.

Example 12

The mixture of 0.1 g. methyl 2-[4-cis-3,4-dihydroxy-1,2,3,4-tetrahydro-1-naphthyl)-phenoxy] - isobutyrate, 2 ml. 2,2-dimethoxypropane and 3 crystals of p-toluenesulfonic acid is allowed to stand for half an hour on the steam bath whereupon it is diluted with 20 ml. chloroform. It is washed with 5% aqueous potassium carbonate and water, dried, and evaporated. The residue is taken up in the minimum amount of pentane, the solution cooled in a Dry Ice-acetone bath, the precipitate formed filtered off and recrystallized again from pentane and hexane, to yield the acetonide of the methyl 2-[4-(cis-3,4-dihydroxy-1,2,3,4-tetrahydro - 1 - naphthyl)-phenoxy]-isobutyrate of the formula

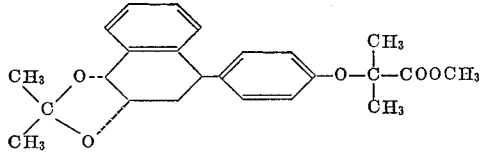

melting at 75 to 76°.

Example 13

The mixture of 1 g. methyl 2-[4-(cis-3,4-dihydroxy-1,2,3,4-tetrahydro-1-naphthyl)-phenoxy] - isobutyrate, 7.5 ml. pyridine and 10 ml. acetic anhydride is allowed to stand for one hour on the steam bath and poured into ice water. The mixture is extracted with diethyl ether, the extract washed with 2 N hydrochloric acid and water, dried and evaporated. The residue is taken up in the minimum amount of hexane, the solution chromatographed on alumina (neutral, activity III) and the column eluted with benzene and diethyl ether. The combined fractions are evaporated and the residue recrystallized from hexane, to yield the methyl-2-[4-(cis-3,4-diacetoxy-1,2,3,4-tetrahydro-1-naphthyl)-phenoxy]-isobutyrate of the formula

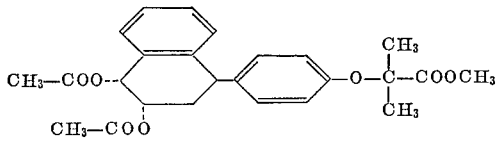

melting at 123 to 126°.

Example 14

Esterifying the:

(1) α[4 - (1,2,3,4 - tetrahydro-1-naphthyl)-phenoxy]-acetic acid (M.P. 125–125°).

(2) α-[4 - (1,2,3,4 - tetrahydro-1-naphthyl)-phenoxy]-butyric acid (M.P. 140–141°).

(3) 2-(4 - indanyl-1-phenoxy)-isobutyric acid (I.R. bands at 740, 820 and 1704 cm.$^{-1}$).

(4) 2-(4 - benzosuberanyl-1-phenoxy) - isobutyric acid (I.R. bands at 745, 830 and 1708 cm.$^{-1}$).

(5) 2-[4 - (6-methoxy-1,2,3,4-tetrahydro-1-naphthyl)-phenoxy]-isobutyric acid (I.R. band at 1350 cm.$^{-1}$).

(6) 2-[4 - (7-chloro-1,2,3,4 - tetrahydro-1-naphthyl)-phenoxy]-isobutyric acid (M.P. 117–118°).

(7) 2-[4 - (5 - methoxy-1,2,3,4-tetrahydro-1-naphthyl)-phenoxy]-isobutyric acid (M.P. 131–132°).

(8) 2-[3 - (1,2,3,4 - tetrahydro-1-naphthyl)phenoxy]-isobutyric acid (cyclohexylammonium salt M.P. 143°).

(9) 2-[2 - (1,2,3,4 - tetrahydro-1-naphthyl)-phenoxy]-isobutyric acid (M.P. 131–132°).

(10) γ-[4 - (1,2,3,4-tetrahydro-1-naphthyl)-phenoxy]-butyric acid (M.P. 142–143°).

(11) 2-[4 - (7 - trifluoromethyl - 1,2,3,4 - tetrahydro-1-naphthyl)-phenoxy]-isobutyric acid (I.R. band at 1702 cm.$^{-1}$).

(12) 2-[4 - (5-methyl-1,2,3,4-tetrahydro-1-naphthyl)-phenoxy]-isobutyric acid (I.R. band at 1705 cm.$^{-1}$).

(13) α-[4 - (1,2,3,4-tetrahydro-1-naphthyl)-phenoxy]-propionic acid (M.P. 124–126°), with methanolic hydrochloric acid, e.g. as illustrated in Example 8, oxidizing the resulting methyl ester e.g. as illustrated in Example 4, reducing the resulting ketone, e.g. as illustrated in Examples 2 and 6, dehydrating the resulting alcohol, e.g. as illustrated in Examples 3 and 11, oxidizing the resulting olefinic product according to said examples and saponifying at any stages resulting methyl esters, the acids of Formula I are obtained, wherein $A_1$ is one of the moieties

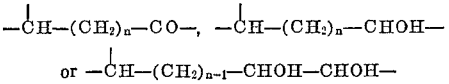

or $-\overset{|}{\mathrm{CH}}-(\mathrm{CH}_2)_{n-1}-\mathrm{CHOH}-\mathrm{CHOH}-$ and the remaining symbols have the following meaning:

| No. | Ph$_1$ | Ph$_2$ | $n$ | A$_2$ |
|---|---|---|---|---|
| 1 | 1,2-C$_6$H$_4$ | 1,4-C$_6$H$_4$ | 2 | $-\mathrm{CH}_2-$ |
| 2 | 1,2-C$_6$H$_4$ | 1,4-C$_6$H$_4$ | 2 | $-\overset{|}{\mathrm{CH}}-\mathrm{C}_2\mathrm{H}_5$ |
| 3 | 1,2-C$_6$H$_4$ | 1,4-C$_6$H$_4$ | 1 | $\mathrm{CH}_3-\overset{|}{\underset{|}{\mathrm{C}}}-\mathrm{CH}_3$ |
| 4 | 1,2-C$_6$H$_4$ | 1,4-C$_6$H$_4$ | 3 | Same as above. |
| 5 | 4-CH$_3$O-1,2-C$_6$H$_3$ | 1,4-C$_6$H$_4$ | 2 | Do. |
| 6 | 5-Cl-1,2-C$_6$H$_3$ | 1,4-C$_6$H$_4$ | 2 | Do. |
| 7 | 3-CH$_3$O-1,2-C$_6$H$_3$ | 1,4-C$_6$H$_4$ | 2 | Do. |
| 8 | 1,2-C$_6$H$_4$ | 1,3-C$_6$H$_4$ | 2 | Do. |
| 9 | 1,2-C$_6$H$_4$ | 1,2-C$_6$H$_4$ | 2 | Do. |
| 10 | 1,2-C$_6$H$_4$ | 1,4-C$_6$H$_4$ | 2 | $-(\mathrm{CH}_2)_3-$ |
| 11 | 5-CF$_3$-1,2-C$_6$H$_3$ | 1,4-C$_6$H$_4$ | 2 | $\mathrm{CH}_3-\overset{|}{\underset{|}{\mathrm{C}}}-\mathrm{CH}_3$ |
| 12 | 3-CH$_3$-1,2-C$_6$H$_3$ | 1,4-C$_6$H$_4$ | 2 | Same as above. |
| 13 | 1,2-C$_6$H$_4$ | 1,4-C$_6$H$_4$ | 2 | $-\overset{|}{\mathrm{CH}}-\mathrm{CH}_3$ |

Example 15

Substituting in Example 4 the racemic methyl-2-[4-(1,2,3,4-tetrahydro-1-naphthyl)-phenoxy] - isobutyrate by the methyl ester of the optically active l- or d-2-[4-(1,2,3,4-tetrahydro-1-naphthyl)-phenoxy]-isobutyric acids ($[\alpha]^{25}_D=-27°$ or $+27°$), the methyl l- or d-2-[4-(4-oxo - 1,2,3,4-tetrahydro-1-naphthyl)-phenoxy]-isobutyrates are obtained $[\alpha]^{25}_D=-62°$ or $+62°$, respectively.

Said optically active esters or the corresponding free acid are reduced as described in Example 6 or 11, to yield the optically active trans-l- or d-2-[4-(4-hydroxy-1,2,3,4-tetrahydro-1-naphthyl)-phenoxy]-isobutyric acids melting at 150–153°, $[\alpha]^{25}_D=-22°$ or $+22.3°$, respectively, or their methyl esters.

The latter are dehydrated according to the method illustrated by Example 11, to yield under inversion of the rotation (at the D-line) the methyl d- or l-2-[4-(1,2-dihydro-1-naphthyl)-phenoxy]-isobutyrates, showing in dilute methanolic solution an $[\alpha]^{25}_D=+31.5°$ or $-22.2°$, respectively (optical rotatory dispersion measurements are performed at very high dilutions due to the high rotational values at lower wave lengths in the range of 200–400 mμ, due to the very high degrees of rotational power).

Said d- or l-dihydro compounds are oxidized according to the method illustrated in Example 11, to yield, with optical inversion, the l- or d-2-[4-(cis-3,4-dihydroxy-1,2,3,4-tetrahydro-1-naphthyl)-phenoxy]-isobutyric acids melting at 158–160°, $[\alpha]^{25}_D=-65.8°$ or $+65.8°$ respectively. The diacetate of the dextro-rotatory compound, obtained according to the method illustrated in Example 13, melts at 142–143°, $[\alpha]^{25}_D=+111.7°$.

Example 16

Preparation of 1000 tablets, each containing 50 mg. of the active ingredient:

| Formula: | G. |
|---|---|
| Trans - 2 - [4-(4-hydroxy-1,2,3,4-tetrahydro-1-naphthyl)-phenoxy]-isobutyric acid | 33.0 |
| Lactose U.S.P. | 51.7 |
| Corn starch | 13.0 |
| Stearic acid | 1.0 |
| Magnesium stearate | 1.0 |
| Colloidal silica | 0.3 |
| Purified water, q.s. | |

Procedure: All the powders are passed separately through a screen with 0.3 mm. openings and mixed well. From one-third of the starch and a suitable amount of water, a paste is formed in order to granulate the powders of the active ingredient, the lactose and one-third of the starch, if necessary, with an additional amount of water. The granulate is dried overnight at 35°, broken on a screen with 1.2 mm. openings, mixed with the remainder of the starch, the stearic acid, magnesium stearate and colloidal silica, and compressed into 150 mg. tablets using concave punches with 7.1 mm. diameter, uppers bisected.

I claim:

1. A pharmaceutical composition comprising a hypolipidemically effective amount of a compound of the formula

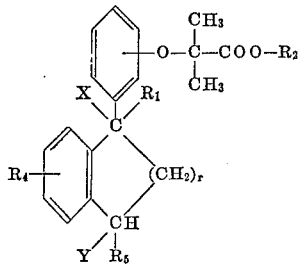

in which one of X and Y is a direct bond and the other is hydroxy-methylene or carbonyl, $r$ is an integer from 0 to 2, $R_1$ is hydrogen or methyl, $R_2$ is hydrogen or lower alkyl, $R_4$ is hydrogen, methyl or chloro and $R_5$ is hydrogen or it is hydroxy when Y is hydroxy-methylene, or the alkali metal salts of the compounds in which $R_2$ is hydrogen, together with an enterally applicable pharmaceutical excipient.

2. A composition as claimed in claim 1, wherein the effective compound is that of the formula

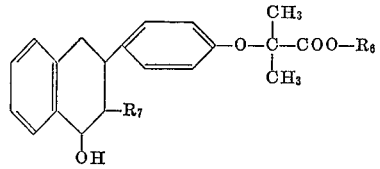

in which $R_6$ is hydrogen, an alkali metal or lower alkyl and $R_7$ is hydrogen or hydroxy.

3. A composition as claimed in claim 1, wherein the effective compound is 2-[4-(4-oxo-1,2,3,4-tetrahydro-1-naphthyl)-phenoxy]-isobutyric acid.

References Cited

FOREIGN PATENTS 860,303   2/1961   Great Britain _____ 260—520

ALBERT T. MEYERS, Primary Examiner

L. SCHENKMAN, Assistant Examiner

U.S. Cl. X.R.

424—248, 250, 267, 311